Earl A. Weilmuenster
Joel A. Zaslowsky
INVENTORS

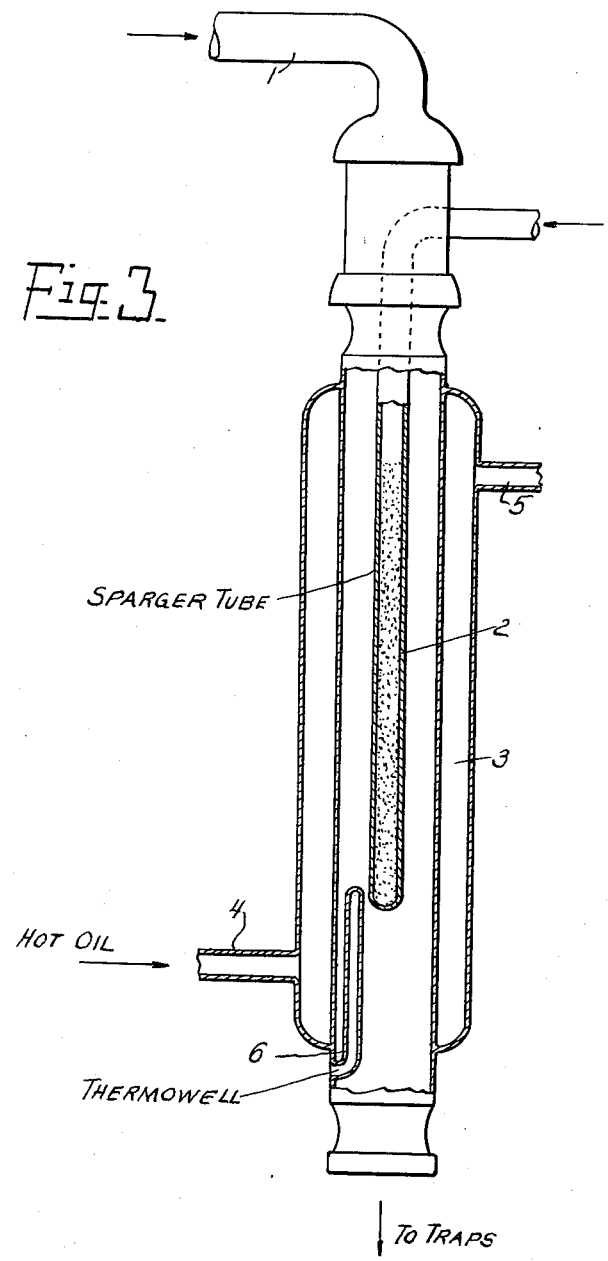

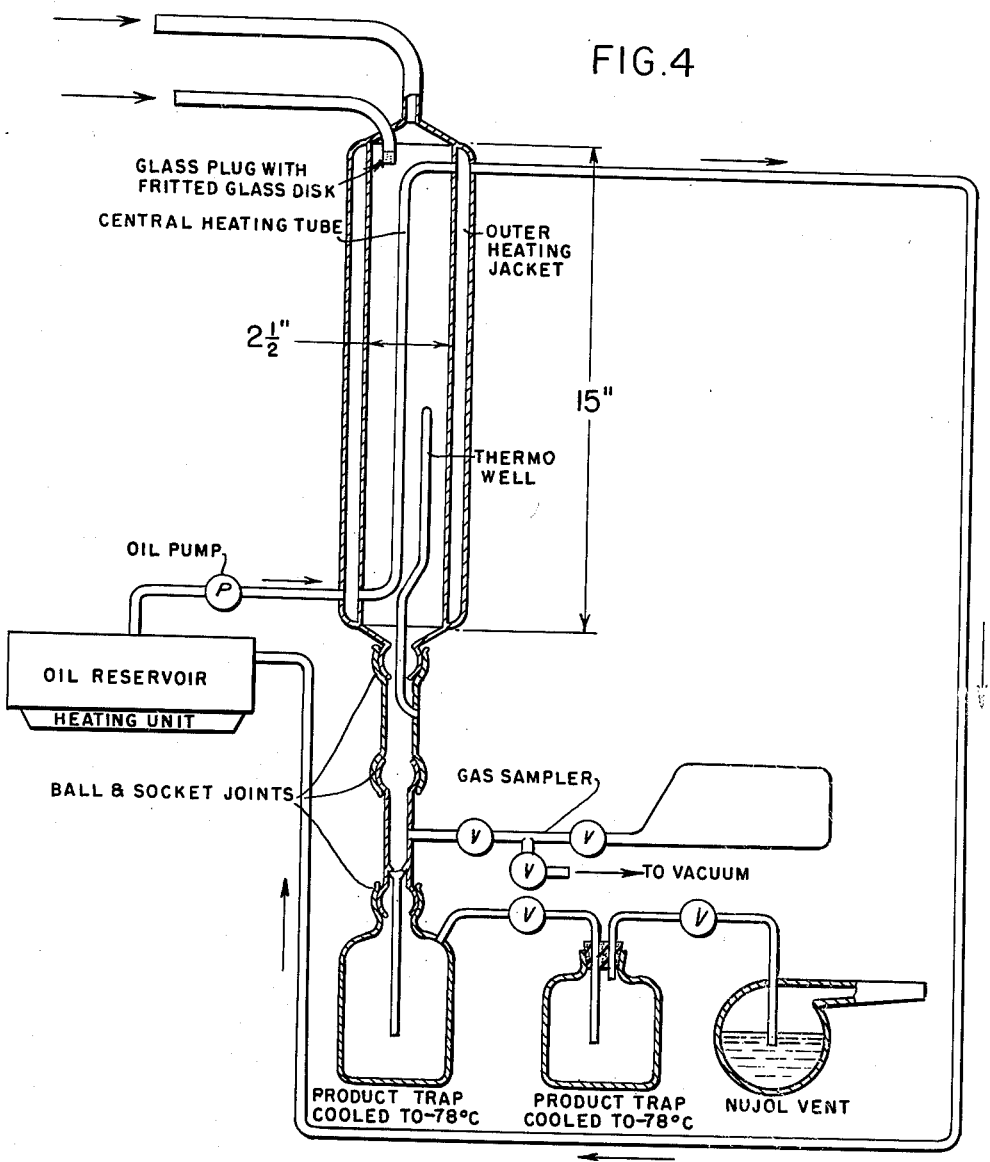

United States Patent Office 3,206,514
Patented Sept. 14, 1965

3,206,514
LIQUID BOROHYDROCARBONS AND PROCESS FOR THEIR PREPARATION
Earl A. Weilmuenster, Kenmore, and Joel A. Zaslowsky, Niagara Falls, N.Y., assignors, by mesne assignments, to Olin Mathieson Chemical Corporation, a corporation of Virginia
Filed Sept. 13, 1955, Ser. No. 533,944
10 Claims. (Cl. 260—606.5)

This application is a continuation-in-part of our copending applications Serial Nos. 386,153, filed October 15, 1953; 386,372, filed October 15, 1953; 422,848, filed April 13, 1954 and 425,281, filed April 23, 1954, all of which are now abandoned.

Our invention relates to the production of relatively stable liquid borohydrocarbons by reaction of diborane with a hydrocarbon of 3 to 5 carbons having a high degree of unsaturation, particularly, a compound of the acetylene series or a diene.

The reaction of diborane with various hydrocarbons has been proposed and attempted previously. In general, the reaction of diborane with saturated hydrocarbons does not go while the reaction of diborane with unsaturated materials such as ethylene and acetylene goes with such intensity that a violent reaction resulting in decomposition of liquid products to gases and solid products occurs. One of the objects of our invention is to provide a process for producing boron-containing hydrocarbons in stable relatively non-volatile liquid state such that the liquids can be utilized as high energy fuels.

We have discovered that a liquid high energy fuel can be produced by reaction of diborane with a compound of the acetylene series or a diene, for example, by mixing the two gases at a temperature of about 100° C. to 250° C. in a carrier stream of a diluent gas such as hydrogen. The diborane and unsaturated hydrocarbon gas spontaneously react upon admixture under the condition of elevated temperature. The gases can be separately preheated and introduced to a reaction zone maintained at a controlled elevated temperature, or the cooled gases can be introduced as such to the reaction zone whereupon a short induction period, depending upon the temperature, is usually observed before reaction takes place. The reaction is exothermic, and therefore once initiated is self-sustaining. Depending upon the size and the design of the reactor, the volume of the reactants, and the quantity of diluent gas, it is at times desirable to provide means for cooling the reaction zone in order to control the temperature, preferably at about 110° to 200° C. Advantageously, the reactant gases are mixed in about equal parts by volume, but the nature of the product can be controlled to a significant extent by variation in the reactant proportions. The volume of diluent gas can be varied although a mixture containing four parts hydrogen, one part of unsaturated hydrocarbon gas, such as butadiene, and one part diborane has been used with advantage.

When the reaction occurs a white cloud is formed, which is carried through the reactor by the diluent gas. The reaction products are chiefly liquids of low vapor pressure. The conversion of the two reactant gases is about 80 to 85 percent per pass. The reaction products can be separated from the reactor effluent by cooling or by extraction with a suitable solvent, such as the liquid obtained as a product from the reaction. The small amount of solids formed can be removed from the liquid products by centrifugal filtration, or from the reactor gas stream by means of a cyclone separator. The remaining gas stream consisting of the diluent gas and a small amount of unsaturated hydrocarbon gas, such as butadiene, and diborane can be compressed and recycled to the reactor. The desired amounts of make-up unsaturated hydrocarbon gas and diborane then are added to maintain proper feed compositions. In a continuous process it may be necessary to continually purge a quantity of the recycle gas stream in order to prevent a build-up of hydrogen and saturated hydrocarbons which are produced during the reaction.

Our invention will be further described with reference to FIGURES 1-4.

FIGURE 3 is an elevational view, partially in section, of one type of reactor suitable for use in carrying out the process of this invention.

FIGURE 4 is an elevational view, partially in section, of another type of reactor and auxiliary equipment suitable for use in carrying out the process of this invention.

Figure 1:
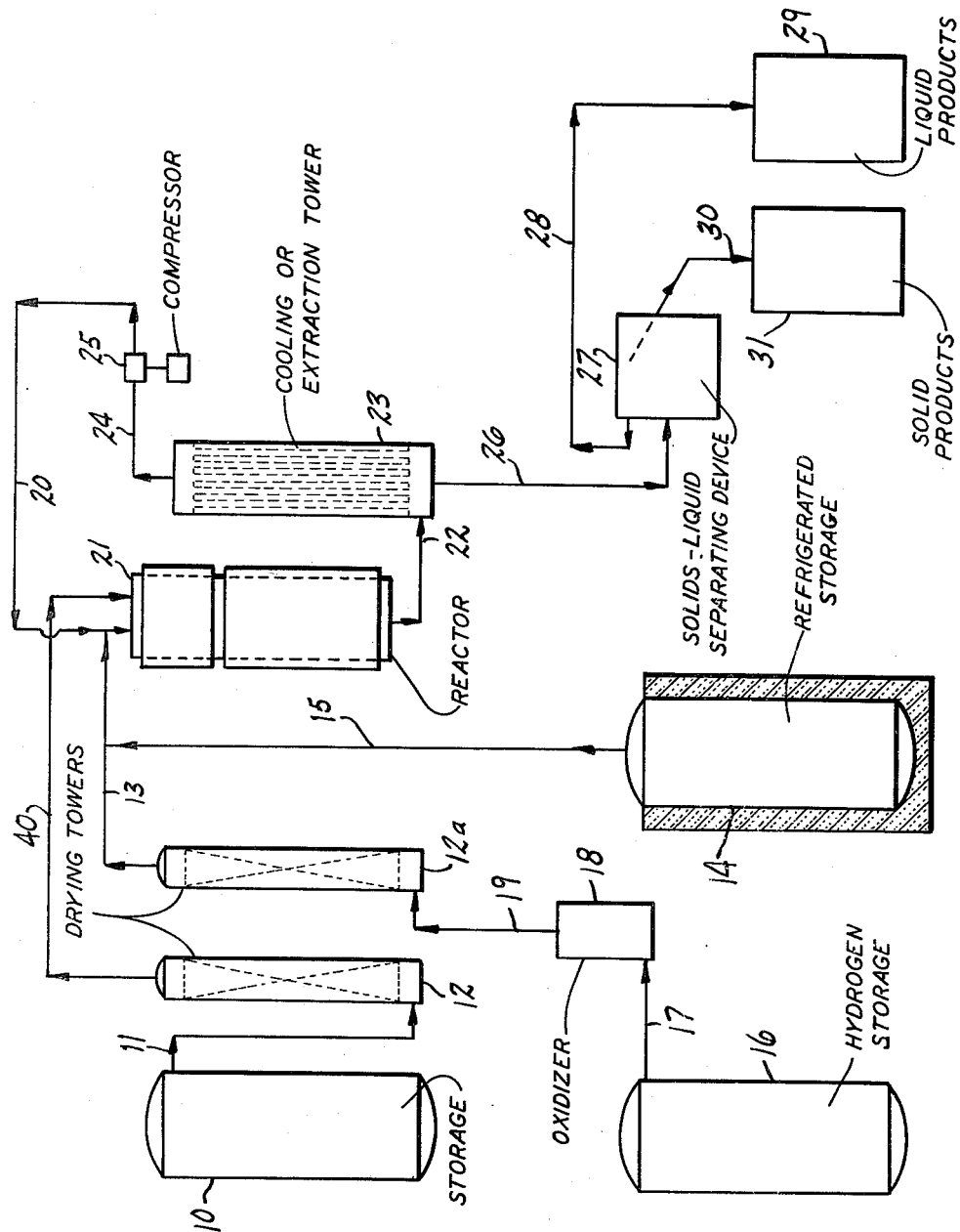
FIGURE 1 is a schematic drawing of the process and apparatus employed in carrying out the process of this invention.

In FIG. 1, unsaturated hydrocarbon gas, such as butadiene, from storage tank 10 is passed by means of line 11 through drying tower 12 which is packed with a desiccant such as activated alumina or silica gel. After removal of traces of moisture in drying tower 12, the butadiene stream is passed to jacketed reactor tube 21 by means of line 40. Hydrogen, or other diluent gas such as nitrogen, is passed from storage tank 16 through line 17 to deoxidizer 18 wherein traces of oxygen are removed by contact with a suitable contact material such as heated copper gauze. The deoxidized hydrogen stream is passed by line 19 through drying tower 12a for removal of traces of moisture and thence by line 13 to reactor 21. Diborane from refrigerated storage tank 14 is injected into line 13 carrying the stream of hydrogen gas by means of line 15 before the carrier stream is introduced to reactor 21.

The temperature in reactor 21 is maintained by appropriate circulation of a heating and/or cooling means at a level that induces reasonably rapid reaction but below a level that promotes decomposition of products, or excessive formation of solid products, or explosive violence. For the reaction of butadiene and diborane, a temperature of about 100° to 250° C. appears to be desirable. Below 100° C., the reaction is slow. At temperatures substantially exceeding 150° C., the reaction tends to go with increasing intensity, resulting in the production of higher molecular weight products. Above 200° C. increasing amounts of high molecular weight solids, which are undesirable, are formed.

After a short residence time in the reactor, the reaction mixture is passed through a cooling or extraction tower 23 wherein liquid products are condensed and/or absorbed, and solid products are scrubbed out. The uncondensed gas stream can be recycled through line 24, compressor system 25 and line 20 for injection into the hydrogen-diborane feed line 13. The condensed liquid products are passed by means of line 26 to a solid-liquid separating device 27 for separation of solid products as indicated by line 30 to storage vessel 31 and recovery of liquid products as indicated by line 28 to storage vessel 29.

Figure 2:
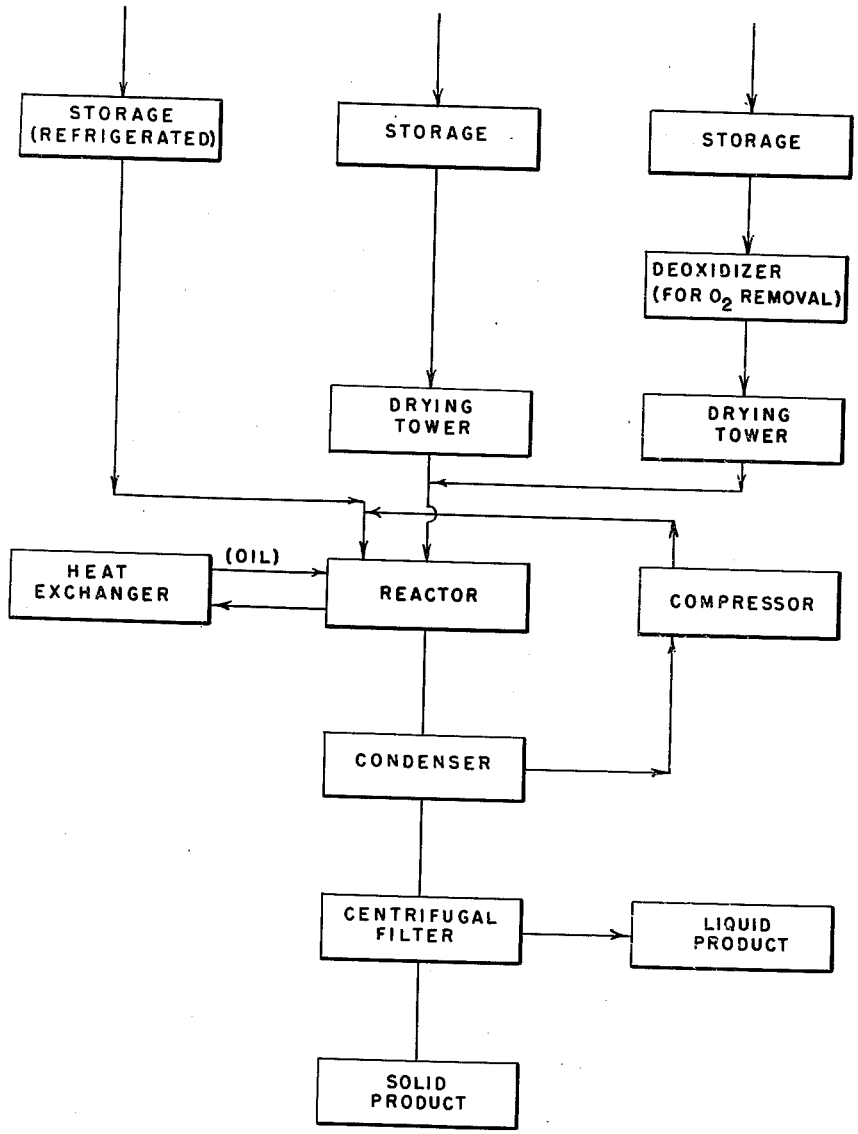
FIGURE 2 is a block diagram of the process of this invention.

Another form of operating procedure for producing a product falling within the scope of our invention is illustrated diagrammatically in FIG. 2 of the accompanying drawings. Unsaturated hydrocarbon gas, such as allene, from a storage vessel is dried, diluted with hydrogen, and the mixture then passed into a downflow reactor. The hydrogen used as a diluent for the allene if first passed through a deoxidizer for removal of any oxygen, and is then dried. Diborane from a suitable refrigerated storage vessel, together with recycled hydrogen and diborane, is simultaneously charged to the reactor. The temperature of the reaction zone is maintained between 110° C. and 140° C. by circulation of a stream of oil through the reactor jacket and then through a heat exchanger. Actual introduction of the allene and accompanying hydrogen is accomplished through a long perforated tube which extends approximately the entire distance of the heated reaction zone. The reaction occurs instantaneously in the range of temperature mentioned, and the products and unreacted gases are then conducted to a low temperature condenser whereby the diborane-allene product is removed. Diluent together with unreacted gases passing through the condenser is sent to a compressor and recycled to the reaction zone after being combined with the fresh diborane feed. Product from the low temperature condenser is sent to a centrifugal filter which removes any small quantities of solid product that may have been formed during the reaction.

The following illustrative experimental Examples I to V further illustrate the invention. In the examples, the reaction was initiated by mixing diborane with equimolar amounts of butadiene in a heated reaction tube of downflow design. The diborane was diluted with four parts of hydrogen. The product was collected as an orange oil in a cold trap at the bottom of the reactor. In most of the run described, only a trace of solids was formed. When the oil was pumped free of volatile components, a small amount of a liquid, having a vapor pressure of about 28–30 mm. of mercury at 0° C. was condensed in another trap. The molecular weight (82) of this volatile liquid was in agreement for a 1:1 addition compound of diborane and butadiene.

The remaining non-volatile oil, which was the principal product, decomposes upon distillation at a temperature above 200° C. to solid materials. The product is stable in bulk form at room temperature, but it is pyrogenic when a large surface is exposed, for example as when the liquid is absorbed on a cloth rag. The carbon to boron ratio of the product appears to be about 3.5. The carbon to boron ratio can be varied from about 2.0 to 4.0 by varying the molar ratios of reactants charged to the reaction zone. The analysis typically is about 68 percent carbon, 13 percent hydrogen and 19 percent boron by weight. After hydrolysis, only about half of the boron is titratable (as boric acid).

EXAMPLE I

In this run, the gases were mixed at an initial temperature of 37° C. which rose during the run to 10° C. The reactor temperature was initially 120° C. and rose in the course of the run to 137° C. The reaction occurred after 1¼ minutes. 42 ml. (STP) of gas of a −78° C. fraction was collected which had a vapor pressure at 0° C. of 37 mm. of mercury. The conversion of diborane was 94 percent and the conversion of butadiene was 90 percent.

EXAMPLE II

In this run, the gases were mixed at 37° C., which rose to 121° C. during the run. The reactor temperature was initially 110° C. and rose to 120° C. during the run. The reaction occurred after 1½ minutes and 24 ml. (STP) of gas of the −78° C. fraction was collected which had a vapor pressure at 0° C. of 28 mm. of mercury. The conversion of diborane was 88 percent and the conversion of butadiene was 85 percent.

In similar runs, at lower temperatures, no evidence of reaction was observed at reactor temperatures of 75° C. and 85° C. At a reactor temperature of 95° C. to 101° C., only 6 percent conversion of diborane resulted after 15 minutes and only a trace of the material was collected as a −78° C. fraction. When the initial reaction temperature was elevated from 95° C. to 100° C., the conversion rose to about 70 to 80 percent and the reaction took place in about 2–4 minutes.

EXAMPLE III

In this run, the initial mixing temperature was 39° C., which rose during the run to 115° C. The initial reaction temperature was 110° C. and heating was discontinued during the reaction period so that the reactor temperature decreased to about 66° C. at the end of the run. The reaction occurred after 2½ minutes and was self-sustaining. All the reaction products leaving the reactor were trapped out at −78° C. The products weighed 1.305 grams. About 0.511 gram of diborane was reacted. The overall yield of liquid product was 79 percent.

EXAMPLE IV

In a similar run to that of Example III, the mixing temperature was initially 36° C. and finally 116° C. The initial reactor temperature was 120° C. and the final reactor temperature was 63° C. The reaction occurred after 1½ minutes and 4.3 grams of liquid products were collected from 1.12 grams of diborane. The conversion of butadiene was 96 percent, and the conversion of diborane was 80 percent.

EXAMPLE V

In a similar run to that of Example IV, the initial mixing temperature was 40° C. and the final mixing temperature was 115° C. The initial reactor temperature was 120° C. and the final reactor temperature was 50° C. During the reaction, 36 grams of liquid product were obtained from 9 grams of diborane for a 99 percent conversion of butadiene. The conversion of diborane was 66 percent.

Examples VI to XV which follow illustrate the application of our invention to unsaturated hydrocarbon gases other than butadiene.

EXAMPLE VI

Following procedure similar to that of the above examples, a mixture of four parts hydrogen and one part allene were mixed with diborane (2 parts) in a heated reaction zone. The reaction temperature was 125° C., and the reaction occurred after 2 minutes. A liquid boron containing product of 2.5 grams was collected by condensation for a calculated conversion of 34 percent based on diborane. The product analyzed 30 percent boron, 56 percent carbon and 14 percent hydrogen by weight.

EXAMPLE VII

Following procedure similar to that of the above examples, a mixture of four parts hydrogen and one part vinyl acetylene was mixed with diborane (1.5 part) in a heated reaction zone. The reaction temperature was 75° C., and the reaction occurred after 0.5 minute. A liquid boron-containing product of 10 grams was collected by condensation for a calculated conversion of 75 percent based on diborane.

EXAMPLE VIII

Following procedure similar to that of the above examples, a mixture of four parts hydrogen and one part methyl acetylene was mixed with diborane (1 part) in a heated reaction zone. The reaction temperature was 140° C., and the reaction occurred after 0.5 minute. A liquid boron-containing product of 13 grams was collected by condensation for a calculated conversion of 91 percent based on diborane.

EXAMPLE IX

In this experiment, a stream composed of a gaseous mixture of hydrogen and diborane and a gas stream composed of allene were fed into a downflow jacketed reaction tube maintained at a temperature of 120° C., the molecular ratio of hydrogen to diborane to allene being 5:2:1. The hydrogen was passed through a deoxidizing chamber to remove any oxygen present and through a drying chamber in order to remove any traces of water before the mixture was passed into the reaction tube. The reaction was run for a period of forty minutes, resulting in a conversion of 47.8 percent of the diborane and 91.4 percent of the allene to yield 1.050 grams of liquid product when the effluent from the reaction tube was cooled to −78° C. This liquid product contained a molecular ratio of diborane:allene of 1.13 and analyzed 34.7; 35.0 percent boron by weight, so that it had a heating value higher than 20,000 B.t.u. per pound.

EXAMPLE X

According to this example, three experiments were performed in which a dry, deoxidized gaseous mixture of hydrogen, allene and diborane was introduced through a fritted glass disc into the lower part of a heated column of mercury. Liquid product was collected at −78° C. and analyzed 29 to 34 percent by weight boron and had an average B.t.u. per pound value of about 22,300 net. This liquid product appeared to become viscous on standing. After separation at −78° C. the liquid product was transferred to a vacuum train where the vapor pressure was determined.

In the first experiment, the molecular feed ratio of hydrogen:diborane:allene was 7.8:1.8:1 and the mercury column was two inches high and was maintained at 166–174° C. The −78° C. trap contained 0.82 gram of liquid product having a vapor pressure of 37 mm. of mercury at 0° C. after standing for several days. 0.049 gram mole of allene and 0.087 gram mole of diborane were passed through the reactor. Part of the diborane (0.035 gram mole) was recovered unchanged. Therefore, the ratio of material reacting was 0.052 gram mole to 0.049 gram mole of diborane to allene. The liquid product analyzed 34.0; 34.3 percent by weight of boron and 50.5 percent by weight of carbon which indicates an average composition substantially that of a 1:1 molecular adduct of diborane and allene.

In the second experiment, a hydrogen:diborane:allene molecular feed ratio of 8.6:1.3:1 and a two inch mercury column maintained at a temperature of 164–177° C. were used. A 2.4 gram yield of liquid product was condensed out in the −78° C. trap; this material had a vapor pressure of 72 mm. of mercury at 0° C.

In the third experiment, the molecular feed ratio of hydrogen:diborane:allene was 6.7:0.97:1 and a one inch mercury column at 173–181° C. was used. A yield of 2.69 grams of liquid product was collected in the −78° C. trap; this material had a vapor pressure of 81 mm. of mercury at 0° C.

EXAMPLE XI

In this experiment, a stream composed of a gaseous mixture of hydrogen and diborane in a molecular ratio of 25:1 and a gas stream composed of a mixture of hydrogen and methylacetylene in a molecular ratio of 5:1 were fed into a downflow jacketed reaction tube maintained at a temperature of 125° C. The molecular ratio of hydrogen to diborane to methylacetylene in the total feed was 10:2:1. The hydrogen was passed through a deoxidizing chamber to remove any oxygen present and through a drying chamber in order to remove any traces of water before the mixture was passed into the reaction tube. After the reaction had been run for a period of time, there was separated from the effluent from the reaction tube, by cooling to −78° C., an amount of liquid product which contained about 25 percent by weight of boron by analysis.

EXAMPLE XII

In this experiment, the procedure of Example XI was substantially repeated using a molecular ratio of hydrogen to diborane to methylacetylene of 8:2:1, with all of the hydrogen being introduced into the reaction tube in the diborane stream and with a reaction temperature of 136–140° C. 0.826 gram of liquid product were separated by cooling the reactor temperature to −78° C. and this material analyzed 24.7; 24.5 percent by weight of boron.

EXAMPLE XIII

In this experiment, Example XII was substantially repeated using a molecular ratio of hydrogen to diborane to methylacetylene of 10:1.2:1 and using a reaction temperature of 131–140° C. 75.0 percent of the diborane and 96.0 percent by weight of the methylacetylene were converted. 1.042 grams of liquid product were obtained by cooling the reactor effluent to −78° C. and this product analyzed 31.7 percent by weight of boron by material balance.

EXAMPLE XIV

The apparatus employed in performing this example is illustrated in FIG. 3. The apparatus was essentially a downflow jacketed reaction tube about twenty inches long made of glass, provided with an inlet line 1 for the introduction of diborane, with sparger tube 2 for the introduction of methylacetylene, with jacket 3 provided with inlet line 4 and outlet line 5 for the introduction and removal of heat transfer medium (hot oil), and with thermowell 6 for measuring reaction temperature.

In Experiment A which is summarized in Table I below, diborane was diluted with 5.7 parts by volume of hydrogen which had been passed through a deoxidizing chamber to remove any oxygen and through a drying chamber in order to remove any traces of water. The mixture of diborane and hydrogen in gaseous form was introduced into line 1 of the apparatus. Methylacetylene for the experiment was diluted with 10 parts by volume of hydrogen, and the gaseous mixture was conducted into the reaction zone through the long perforated sparger tube. The molecular ratio of diborane to methylacetylene was 1.75:1. The reaction temperature was 130–120° C. The reaction was carried out for a period of 300 minutes, producing 44 grams of liquid product which condensed from the reactor effluent at −78° C. This liquid product analyzed 27.1; 30.2 percent by weight of boron and had the approximate composition of the 1:1 adduct of diborane and methylacetylene.

Table I

| Experiment | Gas Ratio, Moles [1] | Reaction Temp., °C. | Time, Minutes | Product [2] Wt., gm. | Conversion Percent Diborane | Conversion Percent $C_3H_4$ | Yield, percent |
|---|---|---|---|---|---|---|---|
| A | 10:10:1.75:1 | 130-120 | 300 | 44 | | | |
| B | 10:10:1.75:1 | 126-128 | 20 | 1.5 | | | |
| C | 12:12:3.3:1 | 124-122 | 19 | 1.9 | 41.1 | 95.5+ | 43.4 |
| D | 10:10:1.75:1 | 128-131 | 46 | 4.3 | 59.3 | 100 | 40.0 |
| E [3] | 9.9:9.9:2.8:1 | 128-127 | 15 | 1.67 | 23.0 | 100 | 77.7 |

[1] Ratios referred to are hydrogen (hydrocarbon diluent); hydrogen (diborane diluent): diborane:hydrocarbon.
[2] Liquid product condensed from reactor effluent at −78° C.
[3] In Experiment E 2.91 grams of diborane and 1.48 grams of methylacetylene were introduced into the reactor and 2.24 grams of diborane was present in the reactor effluent.

EXAMPLE XV

In this experiment, the reaction between the methylacetylene and diborane was performed in a hot tube which included an inner coil and an outer chamber through which hot oil was circulated. The oil temperature and the reaction temperature were automatically recorded. Hydrogen, diborane and methylacetylene were introduced into the reactor in a molecular ratio of 9.5:3:1 for a period of 105 minutes to produce 40 grams of liquid product which was condensed from the reactor effluent at −78° C. The reaction temperature was 115–140° C. and the oil temperature was 115–136° C. The net heat of combustion of the liquid product was 22,600 B.t.u. per pound.

The following examples are further illustrations of the preparation of our reaction products using butadiene as the unsaturated hydrocarbon:

EXAMPLE XVI

A straight, down-flow, hot tube reactor, which was about 2½ inches in outer diameter, was utilized in this experiment. The reactor was jacketed and, in addition, contained a central heating tube which ran lengthwise through the reaction zone. Heating of the reactor was accomplished by circulating hot oil through the jacket and through the heating tube. The temperature of the reactor was measured by means of a thermocouple located at the exit end of the heated zone of the reactor. Diborane and hydrogen were admitted to the reactor through the annular space while butadiene and hydrogen were introduced through a gas disperser (fritted glass plug) which was located at the top of the heated reaction zone.

Both the butadiene (Matheson C.P. material) and the diborane were used as received without pre-treatment. Hydrogen utilized in the reaction was passed first through a "Deoxo" unit to remove oxygen before being mixed with the reacting gases as a diluent.

The reactor was heated up to the reaction temperature (184° C.) by passing hot oil through the heating jacket and through the internal heating tube. During the preheating period nitrogen (800 cc. per minute at S.T.P.) was metered through a rotameter, mixed with hydrogen (160 cc. per minute) which had been metered through a rotameter, and passed through a common line into the annular space. During this same heating-up period hydrogen, which had been metered through a rotameter, was introduced into the reaction zone through the disperser tube, at the rate of 640 cc. per minute at S.T.P. With the reactor at reaction temperature (184° C.), butadiene was metered through a rotameter at the rate of 80 cc. per minute at S.T.P., mixed with hydrogen already flowing and introduced into the reaction zone through the disperser. Next, the nitrogen was turned off and diborane, metered through a rotameter at the rate of 800 cc. per minute at S.T.P., was mixed with the hydrogen (already flowing at the rate of 160 cc. per minute) and passed into the annular zone of the reactor through a common inlet. The reaction started instantaneously and a fog was displaced from the exit end of the reactor. A slight rise in temperature was noted; the temperature varied between 184° and 190° C. during the reaction. The reaction mixture, after leaving the reaction zone, was routed through two spiral traps in series which were held at −78° C. The majority of the product condensed in the first trap (approximately 20 grams); in the second trap 10.2 g. were condensed. Non-condensable gases were exhausted from the second trap through a bubble-off filled with Nujol. The reaction was allowed to proceed for 180 minutes.

The products collected in the traps were brought to room temperature gradually and allowed to degas overnight through bubble-offs filled with Nujol. After the solids had been allowed to settle, liquid portions of the two products were separated from the solids by decantation. The liquid material obtained from the first trap analyzed 42.9 percent boron and its mass spectrum showed it to be mainly pentaborane with a small amount of butyldiboranes. Material obtained from the second trap analyzed 39.8 percent boron and its mass spectrum showed it to contain a large amount of pentaborane, a large amount of butyldiboranes (approximately equal quantities of pentaborane and butyldiboranes) and a trace of butylpentaborane.

EXAMPLE XVII

This experiment was allowed to proceed for 195 minutes at a temperature of 189° to 200° C. with the same gas flows as reported in Example XVI. In all other respects the experiment was carried out in the same manner as reported for Example XVI.

The decanted liquid obtained from the first trap, after being degassed overnight, analyzed 46.5 percent boron and weighed 45.2 g. The mass spectrum of this product showed it contained a large amount of butyldiboranes, a moderate amount of pentaborane, and a moderate amount of butylpentaborane. The density was 0.77 g. per cc. and the pour-point was −100° to −105° C.

From the second trap a decanted and degassed liquid product was obtained which analyzed 43.6 percent boron and which weighed 6.2 g. The mass spectrum of this material showed that it contained large amounts of butyldiboranes, a moderate amount of pentaborane, and a moderate amount of butylpentaborane.

EXAMPLE XVIII

Experiments 1 through 6 were performed in a straight, hot-tube reactor (FIG. 4). Hydrogen and the butadiene were mixed in one feed line before entering the heated reaction zone, while the diborane was mixed with hydrogen in another feed line before entering the reaction zone. The stream containing the butadiene was discharged through a fritted disk at the top of the heated zone of the reactor. The stream containing the diborane was discharged at the top of the heated reaction zone. The reactor was heated by a circulating hot oil bath, and the temperature inside the reactor was measured by a thermocouple located in a glass well about 50 mm. from the bottom of the reactor. A gas sampler was located at the reactor exit in order to sample the gaseous product before it was condensed. Two traps in series, cooled to −78° C., condensed the product to a liquid which was analyzed. The noncondensable gases were allowed to escape through a Nujol safety vent ("bubble-off").

The reaction was started by passing a stream of hydrogen and butadiene into the heated reactor at the desired rate of flow. Then the flow of hydrogen and diborane was begun and regulated in the same manner. The resultant liquid product was collected in two traps cooled to −78° C.

A typical experiment is described below and experimental data are summarized in Tables II and III.

In a typical experiment, Experiment 6, the reactor was assembled and heated to 190° C. The flow of hydrogen and butadiene at the rate of 640 and 80 ml. per minute, respectively, was begun, followed by the introduction of the hydrogen and diborane at the rate of 160 and 800 ml. per minute, respectively. After one minute a dense white fog was observed at the outlet of the reactor indicating that a reaction was taking place. A sample of the exit gases was taken after 15 minutes of reaction time and every 30 minutes thereafter. The results of the analyses of these gas samples are given in Table III. After 3¼ hours the reaction was stopped in order to work up the product obtained.

The liquid product obtained from this reaction was allowed to warm to room temperature and the volatile components were allowed to escape through a Nujol bubble-off. The remaining liquid in the two traps amounted to a 26 percent yield based on the total diborane input. A mass spectrometric analysis of the liquid showed that butyldiboranes were the major constituents while pentaborane-9 and butylpentaborane-9 were present in minor amounts. The liquid in the first trap contained 46.5 percent boron while that in the second trap contained 43.6 percent boron. The density of the liquid in the first trap was found to be 0.773 and its pour point was found to be −100° to −105° C.

An analysis of the exit gases from Experiment 5 (Table III) conducted in a straight, hot-tube reactor shows that an increase in temperature from 190°–200° C. increases the amount of hydrogen evolved and decreases the amount of unreacted diborane. Temperatures higher than 200° C. are not feasible because excessive amounts of solids are formed. The 10° increase in temperature approximately doubled the rate of formation of pentaborane-9, and butyldiborane but the rate of formation of tetraborane remained constant.

Experiments 5 and 6 conducted under similar conditions gave 27 percent and 26 percent yields, respectively, of the desired liquid product which had approximately the same boron content, 44 percent boron and 45 percent boron, respectively. The mass spectrometric analysis of both samples showed the major constituents to be butylboranes and pentaborane-9.

*Table II*

| Experiment | Temp., °C. | Time (sec.) | Flow Rates (ml./min.) $H_2/B_2H_6$ | Flow Rates (ml./min.) $H_2/C_4H_6$ | Reaction Time, Min. | Percent (Based Yield on total $B_2H_6$ input) | 1st Trap, gms. liquid prod. | 2nd Trap, gms. liquid prod. | Percent Boron First Trap | Percent Boron Second Trap | Mass Spectrometric Analyses First Trap | Mass Spectrometric Analyses Second Trap |
|---|---|---|---|---|---|---|---|---|---|---|---|---|
| 1 | 179–185 | 22 | 160/800 | 640/80 | 90 | 20 | -------- | 14.9 | -------- | 41.3 | Butylpentaborane-9—Major. Butyldiboranes—Major. Pentaborane-9—Low. | Butyldiborane—Major. Pentaborane-9—Low. Butylpentaborane-9—Trace. |
| 2 | 184–190 | 22 | 160/800 | 640/80 | 180 | 25 | 19.0 | 20.5 | 42.9 | 39.8 | Pentaborane-9—Major. Butyldiborane—Minor. | Pentaborane-9—Major. Butyldiborane—Major. Butylpentaborane-9—Trace. |
| 3 | 186–192 | 22 | 160/800 | 640/80 | 180 | 20+ | 28.3 | 4.0+ | 43.8 | 37.7 | Butyldiborane—Major. Pentaborane-9—Moderate. Butylpentaborane-9—Minor. Decaborane—Trace. Solids: Decaborane, butylpentaborane-9 butyldiboranes and trace of dipentaborylbutane. | Butyldiborane—Major. Pentaborane-9—Moderate. Butylpentaborane-9—Trace. |
| 5 | 189–200 | 22 | 160/800 | 640/80 | 128 | 27 | 29.3 | 6.1 | 44.3 | 44.4 | Butyldiborane—Major. Butylpentaborane-9—Major. Decaborane—Trace. | Pentaborane-9—Major. Butyldiborane—Major. Butylpentaborane—Minor. (See Table III.) |
| 6 | 189–200 | 22 | 160/800 | 640/80 | 195 | 26 | 45.2 | 6.3 | 46.5 | 43.6 | Butyldiborane—Major. Butylpentaborane—Minor. Pentaborane-9—Minor. | Butyldiboranes—Major. Butylpentaborane-9—Minor. Pentaborane-9—Minor. (See Table III.) |

Table III

ANALYSIS OF GAS SAMPLES TAKEN AT 30 MINUTE INTERVALS DURING EXPERIMENTS 5 AND 6

| | Experiment 5 | | | | Experiment 6 | | | |
|---|---|---|---|---|---|---|---|---|
| | A | B | C | D | A | B | C | D |
| Temperature (° C.) | 190 | 190 | 193 | 199 | 189 | 189 | 189 | 189 |
| Time of sample taken (min.) | 15 | 45 | 75 | 105 | 15 | 45 | 95 | 105 |
| Hydrogen (m/e=2) | 58.7% | 59.8% | 61.7% | 63.5% | 63.7% | 62.4% | 63.0% | 58.4% |
| Diborane (m/e=27) | 35.2% | 32.4% | 29.7% | 26.9% | 18.4% | 25.3% | 25.2% | 28.4% |
| Butyldiborane (m/e=40) | .420 | .439 | .410 | .643 | .162 | .350 | .297 | .573 |
| | .305 | .387 | .361 | .644 | .140 | .294 | .235 | .413 |
| Pentaborane-9 (m/e=59) | 1.89% | 2.1% | 2.0% | 3.5% | .8% | 1.6% | 1.3% | 2.2% |
| Butylpentaborane (m/e=116) | Trace | | Trace | .015 | | .023 | | .039 |
| Tetraborane (m/e=47) | .156 | .158 | .206 | 1.58 | .126 | .268 | .235 | .359 |
| Dibutylborane (m/e=124) | | | | Trace | | | | |

% is Volume percent.
Decimals are peak height/total pressure therefore proportional to percent, e.g. see pentaborane-9.
A—After 15 minutes reaction time at 190° C.
B—After 45 minutes reaction time at 190° C.
C—After 30 minutes reaction time at 193° C.
D—After 30 minutes reaction time at 199° C.

Various modifications can be made in the procedures of the specific examples to provide other embodiments which fall within the scope of our invention. Thus, in place of the specific unsaturated hydrocarbons used there can be substituted other hydrocarbons containing from 3 to 5 carbon atoms and which are of the acetylene or diene series, for example cyclopentadiene. Generally the diene is a conjugated one. Mixtures of various hydrocarbons having from 3 to 5 carbon atoms of the acetylene series or diene series can also be utilized. Small amounts of acetylene or ethylene can also be introduced into the reaction system along with the unsaturated hydrocarbon containing from 3 to 5 carbon atoms. The relative amounts of diborane and unsaturated hydrocarbon used can be varied widely. In general, however, the molar ratio of diborane to unsaturated hydrocarbon will be within the range from 0.5:1 to 10:1. In the case of the lower diborane to unsaturated hydrocarbon ratios, the liquid products produced are not as high in heat of combustion as those produced when mixtures relatively rich in diborane are employed. Moreover, the amount of diluent gas introduced into the reaction zone, can be varied widely, the amount so introduced in practice depending upon the amount of diluent required to effect the efficient mixing and heat transfer necessary for any particular mode of operation. In general, the gases entering the reaction system (diborane, unsaturated hydrocarbon and diluent gas) will be composed of from 20 to 90 percent of volume of diluent gas. Diluent gases other than hydrogen can also be employed in accordance with our invention, for example, nitrogen or mixtures of nitrogen and hydrogen. Various procedures can be employed in introducing the diluent gas to the reaction zone. In introducing the diluent gas into the reaction zone, the entire amount of such gas introduced can be introduced in admixture with diborane or with the unsaturated hydrocarbon, or a part can be introduced with the diborane and the remainder with the unsaturated hydrocarbon, or the diluent gas can be introduced as in independent stream with efficient mixing of the diborane, unsaturated hydrocarbon and diluent gas at the time the diborane and unsaturated hydrocarbon contact each other. For best operation, it is important that no oxygen or water enter the reaction system, since these materials react, and under certain conditions react violently, with diborane to form solid boric acid.

In accordance with our process, the reaction is performed at a temperature within the range from about 100° to 250° C., the preferred range being 110° to 200° C. To bring the reactants from room temperature to reaction temperature, the reaction zone can be heated by any appropriate method, such as the circulation of hot oil through a jacket surrounding the reaction zone or a hot bath of heat transfer liquid. The reaction is exothermic, and when once initiated cooling rather than heating may be required, depending upon the efficiency of heat dissipation from the reaction zone.

The compositions of our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The products of our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15: or 20:1, the compression ratio being the absolute pressure of the air after having been compressed (by the compressor in the case of the turbojet or turboprop engine) divided by the absolute pressure of the air before compression. Therefore, the operating combustion present in the combustor can vary from approximately 90 to 300 pounds per square inch absolute at static sea level conditions to about 5 to 15 pounds per square inch absolute at the extremely high altitudes of approximately 70,000 feet. The products of our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the 1 to 1 addition product of diborane and butadiene, for example, this local fuel to air ratio by weight is approximately 0.070. For the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products of the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operation at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products of our invention can also be employed as aircraft gas turbine fuels in admixture with the hydrocarbons presently being used, such as JP-4. When such mixtures are used, the fuel-air ratio in the zone of the combustor where combustion is initiated and the overall fuel-air ratio across the combustor will be proportional to the relative amounts of boron hydrocarbon of the present invention and hydrocarbon fuel present in the mixture, and consistent with the air dilution required to maintain the gas temperatures of these mixtures within accepted turbine operating temperatures.

Because of their high chemical reactivity and heating values, the products of our invention can be employed as fuels in ramjet engines and in afterburning and other auxiliary burning schemes for the turbojet and by-pass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products of our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products of our invention eliminates the need of flameholding devices within the combustion zone of the afterburner. When employed in an afterburner, the fuels of our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products of our invention will improve the combustion process of the ramjet in much the same manner as that described for the afterburner because of their improved chemical reactivity over that of simple hydrocarbon fuels. When employed in a ramjet the fuels of our invention will be simply substituted for hydrocarbon fuels and used in the established manner.

We claim:

1. A process for the production of normally liquid borohydrocarbons which comprises reacting diborane gas with a hydrocarbon of 3 to 5 carbons selected from the group consisting of acetylenes and dienes while they are in admixture with an inert gas at a temperature of about 100° to 250° C.

2. The process of claim 1 wherein the reaction temperature is about 110° to 200° C.

3. The process of claim 1 wherein the hydrocarbon is allene.

4. The process of claim 1 wherein the hydrocarbon is methylacetylene.

5. The process of claim 1 wherein the hydrocarbon is cyclopentadiene.

6. The process of claim 1 wherein the hydrocarbon is vinyl acetylene.

7. The one to one addition product of diborane and butadiene having a molecular weight of 82 and a vapor pressure of about 28–30 mm. of Hg at 0° C.

8. The one to one addition product of diborane and allene having a molecular weight of 68 and a vapor pressure of about 37 mm. of Hg. at 0° C.

9. The process of claim 1 wherein the hydrocarbon is butadiene.

10. A method of preparing an organoboron compound which comprises reacting butadiene with diborane in the gas phase at an elevated temperature.

References Cited by the Examiner

Hurd: Chemistry of the Hydrides, pages 86–7 (1952), John Wiley & Sons, N.Y.

Hurd: J. Amer. Chem. Soc., 70, pages 2053–55.

TOBIAS E. LEVOW, *Primary Examiner.*

ROGER L. CAMPBELL, LEON D. ROSDOL,
*Examiners.*